(12) United States Patent
Lert, Jr. et al.

(10) Patent No.: US 12,304,678 B2
(45) Date of Patent: *May 20, 2025

(54) AUTOMATED RETAIL SUPPLY CHAIN AND INVENTORY MANAGEMENT SYSTEM

(71) Applicant: Symbotic LLC, Wilmington, MA (US)

(72) Inventors: John G. Lert, Jr., Wakefield, MA (US); William J. Fosnight, Windham, NH (US)

(73) Assignee: Symbotic LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,302

(22) Filed: Dec. 21, 2023

(65) Prior Publication Data

US 2024/0124171 A1 Apr. 18, 2024

Related U.S. Application Data

(63) Continuation of application No. 17/240,777, filed on Apr. 26, 2021, now Pat. No. 11,905,058, which is a
(Continued)

(51) Int. Cl.
*B65B 5/10* (2006.01)
*B25J 9/00* (2006.01)
(Continued)

(52) U.S. Cl.
CPC ............... *B65B 5/10* (2013.01); *B25J 9/0096* (2013.01); *B65B 5/00* (2013.01); *B65B 5/08* (2013.01);
(Continued)

(58) Field of Classification Search
CPC ..... B65B 5/10; B65B 5/00; B65B 5/08; B25J 9/0096; B65G 1/1373; B65G 1/1378;
(Continued)

(56) References Cited

U.S. PATENT DOCUMENTS 3,927,773 A 12/1975 Bright
4,007,843 A 2/1977 Lubbers
(Continued)

FOREIGN PATENT DOCUMENTS

AU 2017366895 6/2019
CN 110100256 A 8/2019
(Continued)

OTHER PUBLICATIONS

APO; App. No. 2017366895; Examination Report mailed Apr. 24, 2022; (3 pages).
(Continued)

*Primary Examiner* — Thomas Randazzo
(74) *Attorney, Agent, or Firm* — Perman & Green, LLP

(57) ABSTRACT

A system and method are disclosed for supplying one or more goods to a physical store location. The goods may be received at a distribution center (DC). At the DC, the goods may be decanted from their shipping containers into one or more sub-totes, which are contained within one or more product totes. The sub-totes may be transferred from the one or more product totes to one or more order totes based on a velocity of movement of the plurality of goods at the physical store location.

20 Claims, 9 Drawing Sheets

Related U.S. Application Data continuation of application No. 15/826,045, filed on Nov. 29, 2017, now abandoned.

(60) Provisional application No. 62/427,652, filed on Nov. 29, 2016.

(51) Int. Cl.
| | | |
|---|---|---|
| *B65B 5/00* | (2006.01) | |
| *B65B 5/08* | (2006.01) | |
| *B65G 1/137* | (2006.01) | |
| *B66F 9/06* | (2006.01) | |
| *G05B 19/418* | (2006.01) | |
| *G06Q 10/0631* | (2023.01) | |
| *G06Q 10/08* | (2024.01) | |
| *G06Q 10/0832* | (2023.01) | |
| *G06Q 10/0833* | (2023.01) | |
| *G06Q 10/087* | (2023.01) | |

(52) U.S. Cl.
CPC ......... *B65G 1/1373* (2013.01); *B65G 1/1378* (2013.01); *B66F 9/063* (2013.01); *G05B 19/41895* (2013.01); *G06Q 10/06315* (2013.01); *G06Q 10/08* (2013.01); *G06Q 10/0832* (2013.01); *G06Q 10/0833* (2013.01); *G06Q 10/087* (2013.01)

(58) Field of Classification Search
CPC .............. B66F 9/063; G05B 19/41895; G06Q 10/06315; G06Q 10/08; G06Q 10/0832; G06Q 10/0833; G06Q 10/087
See application file for complete search history.

(56) References Cited

U.S. PATENT DOCUMENTS

| | | |
|---|---|---|
| 4,221,076 A | 9/1980 | Ozawa |
| 4,415,975 A | 11/1983 | Burt |
| 4,428,708 A | 1/1984 | Burt |
| 5,143,246 A * | 9/1992 | Johnson .................. B65F 1/085 220/676 |
| 5,179,329 A | 1/1993 | Nishikawa |
| 5,433,293 A | 7/1995 | Sager |
| 5,472,309 A | 12/1995 | Bernard, II |
| 5,501,295 A | 3/1996 | Mueller |
| 5,526,940 A | 6/1996 | Shea |
| 5,551,823 A | 9/1996 | Maruyama |
| 5,595,264 A | 1/1997 | Trotta, Jr. |
| 5,636,966 A | 6/1997 | Lyon |
| 5,642,976 A | 7/1997 | Konstant |
| 5,890,136 A | 3/1999 | Kipp |
| 5,953,234 A | 9/1999 | Singer |
| 5,996,316 A | 12/1999 | Kirschner |
| 6,289,260 B1 | 9/2001 | Bradley |
| 6,325,586 B1 | 12/2001 | Loy |
| 6,327,576 B1 * | 12/2001 | Ogasawara .......... G06Q 10/087 705/22 |
| 6,494,313 B1 | 12/2002 | Trescott |
| 6,539,876 B1 | 4/2003 | Campbell |
| 6,671,580 B2 | 12/2003 | Campbell |
| 6,729,836 B2 | 5/2004 | Stingel, III |
| 6,744,436 B1 | 6/2004 | Chirieleison |
| 6,805,526 B2 | 10/2004 | Stefani |
| 6,895,301 B2 | 5/2005 | Mountz |
| 7,054,832 B1 | 5/2006 | Vallabh |
| 7,101,139 B1 | 9/2006 | Benedict |
| 7,110,855 B2 | 9/2006 | Leishman |
| 7,139,637 B1 | 11/2006 | Waddington |
| 7,246,706 B1 | 7/2007 | Shakes |
| 7,255,525 B2 | 8/2007 | Smith |
| 7,381,022 B1 | 6/2008 | King |
| 7,532,947 B2 | 5/2009 | Waddington |
| 7,591,630 B2 | 9/2009 | Lert, Jr. |
| 7,603,299 B1 | 10/2009 | Dewey, Jr. |
| 7,640,863 B2 | 1/2010 | Minges |
| 7,751,928 B1 | 7/2010 | Antony |
| 7,861,844 B2 | 1/2011 | Hayduchok |
| 7,894,932 B2 | 2/2011 | Mountz |
| 7,894,933 B2 | 2/2011 | Mountz |
| 7,896,243 B2 | 3/2011 | Herskovitz |
| 7,931,431 B2 | 4/2011 | Benedict |
| 7,938,324 B2 | 5/2011 | Tamarkin |
| 7,991,505 B2 | 8/2011 | Lert, Jr. |
| 8,104,601 B2 | 1/2012 | Hayduchok |
| 8,201,737 B1 | 6/2012 | Palacios Durazo |
| 8,276,740 B2 | 10/2012 | Hayduchok |
| 8,311,902 B2 | 11/2012 | Mountz |
| 8,327,609 B2 | 12/2012 | Krizmanic |
| 8,425,173 B2 | 4/2013 | Lert |
| 8,447,665 B1 | 5/2013 | Schoenharl |
| 8,483,869 B2 | 7/2013 | Wurman |
| 8,527,325 B1 | 9/2013 | Atreya |
| 8,579,574 B2 | 11/2013 | Haenel |
| 8,594,835 B2 | 11/2013 | Lert |
| 8,622,194 B2 | 1/2014 | Dewitt |
| 8,626,335 B2 | 1/2014 | Wurman |
| 8,639,531 B2 | 1/2014 | Hasan |
| 8,690,510 B1 | 4/2014 | Razumov |
| 8,694,152 B2 | 4/2014 | Cyrulik |
| 8,718,814 B1 | 5/2014 | Clark |
| 8,721,250 B2 | 5/2014 | Razumov |
| 8,721,251 B1 | 5/2014 | Razumov |
| 8,734,079 B1 | 5/2014 | Razumov |
| 8,738,177 B2 | 5/2014 | Van Ooyen |
| 8,740,538 B2 | 6/2014 | Lert |
| 8,831,984 B2 | 9/2014 | Hoffman |
| 8,892,240 B1 | 11/2014 | Vliet |
| 8,965,562 B1 | 2/2015 | Wurman |
| 8,972,045 B1 | 3/2015 | Mountz |
| 8,983,647 B1 | 3/2015 | Dwarakanath |
| 9,008,828 B2 | 4/2015 | Worsley |
| 9,008,829 B2 | 4/2015 | Worsley |
| 9,008,830 B2 | 4/2015 | Worsley |
| 9,010,517 B2 | 4/2015 | Hayduchok |
| 9,020,632 B2 | 4/2015 | Naylor |
| 9,037,286 B2 | 5/2015 | Lert |
| 9,051,120 B2 | 6/2015 | Lert |
| 9,096,375 B2 | 8/2015 | Lert |
| 9,111,251 B1 | 8/2015 | Brazeau |
| 9,120,622 B1 | 9/2015 | Elazary |
| 9,129,250 B1 | 9/2015 | Sestini |
| 9,139,363 B2 | 9/2015 | Lert |
| 9,147,208 B1 | 9/2015 | Argue |
| 9,216,857 B1 | 12/2015 | Kalyan |
| 9,242,798 B2 | 1/2016 | Guan |
| 9,242,799 B1 | 1/2016 | O'Brien |
| 9,260,245 B2 | 2/2016 | Este |
| 9,321,591 B2 | 4/2016 | Lert |
| 9,330,373 B2 | 5/2016 | Mountz |
| 9,334,113 B2 | 5/2016 | Naylor |
| 9,334,116 B2 | 5/2016 | Dewitt |
| 9,336,509 B1 * | 5/2016 | Arun Singhal ...... G06Q 10/087 |
| 9,378,482 B1 | 6/2016 | Pikler |
| 9,409,664 B1 | 8/2016 | Vliet |
| 9,423,796 B2 | 8/2016 | Sullivan |
| 9,428,295 B2 | 8/2016 | Vliet |
| 9,466,045 B1 | 10/2016 | Kumar |
| 9,487,356 B1 | 11/2016 | Aggarwal |
| 9,550,624 B2 | 1/2017 | Khodl |
| 9,558,472 B1 | 1/2017 | Tubilla Kuri |
| 9,626,709 B2 | 4/2017 | Koch |
| 9,630,777 B2 | 4/2017 | Yamashita |
| 9,733,646 B1 * | 8/2017 | Nusser .................. B65G 57/03 |
| 9,751,693 B1 | 9/2017 | Battles |
| 9,815,625 B2 | 11/2017 | Dewitt |
| 9,821,959 B2 | 11/2017 | Hognaland |
| 9,827,683 B1 | 11/2017 | Hance |
| 9,852,396 B2 | 12/2017 | Jones |
| 9,978,036 B1 | 5/2018 | Eller |
| 10,000,338 B2 | 6/2018 | Lert, Jr. |
| 10,127,514 B2 | 11/2018 | Napoli |
| 10,189,641 B2 | 1/2019 | Hognaland |

(56) References Cited

U.S. PATENT DOCUMENTS

| | | | |
|---|---|---|---|
| 10,192,195 B1 | 1/2019 | Brazeau | |
| 10,229,385 B2 | 3/2019 | Evers | |
| 10,336,543 B1 | 7/2019 | Sills | |
| 10,360,531 B1 | 7/2019 | Stallman | |
| 10,482,421 B1 | 11/2019 | Ducrou | |
| 10,579,965 B2 | 3/2020 | Meurer | |
| 11,142,402 B2 | 10/2021 | Lert, Jr. | |
| 11,905,058 B2 * | 2/2024 | Lert, Jr. | B65B 5/08 |
| 2001/0049690 A1 * | 12/2001 | McConnell | G07G 1/14 |
| 2002/0059121 A1 | 5/2002 | Schneider | |
| 2002/0077937 A1 | 6/2002 | Lyons | |
| 2002/0082887 A1 | 6/2002 | Boyert | |
| 2002/0133415 A1 | 9/2002 | Zarovinsky | |
| 2002/0143669 A1 | 10/2002 | Scheer | |
| 2003/0110104 A1 | 6/2003 | King | |
| 2003/0197061 A1 | 10/2003 | Din | |
| 2004/0010337 A1 | 1/2004 | Mountz | |
| 2004/0010339 A1 | 1/2004 | Mountz | |
| 2004/0024730 A1 | 2/2004 | Brown | |
| 2004/0084527 A1 * | 5/2004 | Bong | G06Q 30/0639 |
| | | | 235/382 |
| 2004/0111337 A1 | 6/2004 | Feeney | |
| 2004/0249497 A1 | 12/2004 | Saigh | |
| 2004/0254825 A1 | 12/2004 | Hsu | |
| 2005/0035694 A1 * | 2/2005 | Stevens | B65G 1/133 |
| | | | 312/201 |
| 2005/0043850 A1 | 2/2005 | Stevens | |
| 2005/0047895 A1 * | 3/2005 | Lert | B65G 1/1378 |
| | | | 414/273 |
| 2005/0060246 A1 | 3/2005 | Lastinger | |
| 2005/0096936 A1 | 5/2005 | Lambers | |
| 2005/0108114 A1 | 5/2005 | Kaled | |
| 2005/0149226 A1 | 7/2005 | Stevens | |
| 2005/0182695 A1 | 8/2005 | Lubow | |
| 2005/0256787 A1 | 11/2005 | Wadawadigi | |
| 2005/0267791 A1 | 12/2005 | LaVoie | |
| 2005/0278062 A1 | 12/2005 | Janert | |
| 2006/0020366 A1 | 1/2006 | Bloom | |
| 2006/0108419 A1 | 5/2006 | Som | |
| 2006/0182548 A1 | 8/2006 | Gretsch | |
| 2006/0257236 A1 | 11/2006 | Stingel, III | |
| 2007/0011053 A1 | 1/2007 | Yap | |
| 2007/0016496 A1 | 1/2007 | Bar | |
| 2007/0127691 A1 | 6/2007 | Lert, Jr. | |
| 2007/0162353 A1 | 7/2007 | Borders | |
| 2007/0210164 A1 | 9/2007 | Conlon | |
| 2007/0244758 A1 | 10/2007 | Xie | |
| 2007/0276535 A1 | 11/2007 | Haag | |
| 2007/0293978 A1 | 12/2007 | Wurman | |
| 2007/0294029 A1 | 12/2007 | D Andrea | |
| 2008/0040244 A1 | 2/2008 | Ricciuti | |
| 2008/0041947 A1 | 2/2008 | Hollister | |
| 2008/0131241 A1 | 6/2008 | King | |
| 2008/0131255 A1 | 6/2008 | Hessler | |
| 2008/0181753 A1 | 7/2008 | Bastian | |
| 2008/0215180 A1 | 9/2008 | Kota | |
| 2009/0074545 A1 | 3/2009 | Lert | |
| 2009/0149985 A1 | 6/2009 | Chirnomas | |
| 2009/0157472 A1 | 6/2009 | Burazin | |
| 2009/0249749 A1 | 10/2009 | Schill | |
| 2009/0276264 A1 | 11/2009 | Pandit | |
| 2010/0010902 A1 | 1/2010 | Casey | |
| 2010/0060455 A1 | 3/2010 | Frabasile | |
| 2010/0076591 A1 | 3/2010 | Lert, Jr. | |
| 2010/0114790 A1 | 5/2010 | Strimling | |
| 2010/0234980 A1 | 9/2010 | Lapre | |
| 2010/0262278 A1 | 10/2010 | Winkler | |
| 2010/0310344 A1 | 12/2010 | Hinnen | |
| 2010/0316468 A1 | 12/2010 | Lert | |
| 2010/0316469 A1 | 12/2010 | Lert | |
| 2010/0316470 A1 | 12/2010 | Lert | |
| 2010/0322746 A1 | 12/2010 | Lert | |
| 2011/0008138 A1 | 1/2011 | Yamashita | |
| 2011/0238207 A1 | 9/2011 | Bastian, II | |
| 2011/0243707 A1 | 10/2011 | Dumas | |
| 2011/0320034 A1 | 12/2011 | Dearlove | |
| 2012/0029683 A1 | 2/2012 | Keller | |
| 2012/0029685 A1 | 2/2012 | Keller | |
| 2012/0101627 A1 | 4/2012 | Lert | |
| 2012/0143427 A1 | 6/2012 | Hoffman | |
| 2012/0150340 A1 | 6/2012 | Suess | |
| 2012/0173351 A1 | 7/2012 | Hanson | |
| 2012/0186942 A1 | 7/2012 | Toebes | |
| 2012/0195720 A1 | 8/2012 | Sullivan | |
| 2012/0219397 A1 | 8/2012 | Baker | |
| 2012/0298688 A1 | 11/2012 | Stiernagle | |
| 2012/0330458 A1 | 12/2012 | Weiss | |
| 2013/0087610 A1 | 4/2013 | Shin | |
| 2013/0181586 A1 | 7/2013 | Hognaland | |
| 2013/0226649 A1 * | 8/2013 | Grissom | G06Q 10/06315 |
| | | | 705/7.25 |
| 2013/0226718 A1 | 8/2013 | Ascarrunz | |
| 2013/0235206 A1 | 9/2013 | Smith | |
| 2013/0246229 A1 | 9/2013 | Mountz | |
| 2013/0310967 A1 | 11/2013 | Olson | |
| 2013/0317642 A1 | 11/2013 | Asaria | |
| 2013/0346204 A1 | 12/2013 | Wissner-Gross | |
| 2014/0003727 A1 | 1/2014 | Lortz | |
| 2014/0040075 A1 | 2/2014 | Perry | |
| 2014/0052498 A1 | 2/2014 | Marshall | |
| 2014/0062699 A1 | 3/2014 | Heine | |
| 2014/0088758 A1 | 3/2014 | Lert | |
| 2014/0100769 A1 | 4/2014 | Wurman | |
| 2014/0100999 A1 * | 4/2014 | Mountz | G06Q 10/087 |
| | | | 705/28 |
| 2014/0136218 A1 | 5/2014 | Bolene | |
| 2014/0143099 A1 | 5/2014 | Wilkins | |
| 2014/0156553 A1 | 6/2014 | Leach | |
| 2014/0212249 A1 | 7/2014 | Kawano | |
| 2014/0244026 A1 | 8/2014 | Neiser | |
| 2014/0257555 A1 | 9/2014 | Bastian, II | |
| 2014/0271063 A1 | 9/2014 | Lert | |
| 2014/0279294 A1 | 9/2014 | Field-Darragh | |
| 2014/0288696 A1 | 9/2014 | Lert | |
| 2014/0308098 A1 | 10/2014 | Lert | |
| 2014/0324491 A1 | 10/2014 | Banks | |
| 2014/0330603 A1 | 11/2014 | Corder | |
| 2014/0336814 A1 | 11/2014 | Moore | |
| 2014/0343717 A1 | 11/2014 | Dorval | |
| 2014/0350715 A1 | 11/2014 | Gopalakrishnan | |
| 2014/0351101 A1 | 11/2014 | Danelski | |
| 2014/0365341 A1 | 12/2014 | MacLaurin | |
| 2015/0032252 A1 | 1/2015 | Galluzzo | |
| 2015/0051994 A1 | 2/2015 | Ward | |
| 2015/0071743 A1 | 3/2015 | Lert, Jr. | |
| 2015/0134490 A1 | 5/2015 | Collin | |
| 2015/0154535 A1 | 6/2015 | Wappler | |
| 2015/0170256 A1 | 6/2015 | Pettyjohn | |
| 2015/0178671 A1 | 6/2015 | Jones | |
| 2015/0178673 A1 | 6/2015 | Penneman | |
| 2015/0220896 A1 | 8/2015 | Carr | |
| 2015/0262118 A1 * | 9/2015 | Grissom | G06Q 10/08 |
| | | | 700/214 |
| 2015/0266672 A1 | 9/2015 | Lert | |
| 2015/0286967 A1 | 10/2015 | Lert | |
| 2015/0291357 A1 | 10/2015 | Razumov | |
| 2015/0294333 A1 | 10/2015 | Avegliano | |
| 2015/0307279 A1 | 10/2015 | Almada | |
| 2015/0310447 A1 | 10/2015 | Shaw | |
| 2015/0375938 A9 | 12/2015 | Lert | |
| 2016/0016733 A1 | 1/2016 | Lert | |
| 2016/0031644 A1 | 2/2016 | Schubilske | |
| 2016/0055452 A1 | 2/2016 | Qin | |
| 2016/0063604 A1 | 3/2016 | Shaffer | |
| 2016/0075512 A1 | 3/2016 | Lert, Jr. | |
| 2016/0086255 A1 | 3/2016 | Sainfort | |
| 2016/0101940 A1 * | 4/2016 | Grinnell | G05D 1/0289 |
| | | | 700/218 |
| 2016/0107838 A1 | 4/2016 | Swinkels | |
| 2016/0110702 A1 | 4/2016 | Landers, Jr. | |
| 2016/0129592 A1 | 5/2016 | Saboo | |
| 2016/0140488 A1 * | 5/2016 | Lindbo | B65G 1/1373 |
| | | | 705/28 |
| 2016/0145045 A1 | 5/2016 | Mountz | |

(56) References Cited

U.S. PATENT DOCUMENTS

| | | | |
|---|---|---|---|
| 2016/0167227 A1* | 6/2016 | Wellman | B65G 1/10 901/3 |
| 2016/0171592 A1 | 6/2016 | Pugh | |
| 2016/0194151 A1 | 7/2016 | Lindbo | |
| 2016/0223339 A1 | 8/2016 | Pellow | |
| 2016/0236867 A1 | 8/2016 | Brazeau | |
| 2016/0244262 A1 | 8/2016 | O'Brien | |
| 2016/0253740 A1 | 9/2016 | Goulart | |
| 2016/0260158 A1 | 9/2016 | High | |
| 2016/0299782 A1 | 10/2016 | Jones | |
| 2016/0304281 A1 | 10/2016 | Elazary | |
| 2016/0307153 A1 | 10/2016 | Løken | |
| 2016/0311617 A1 | 10/2016 | Van Den Berk | |
| 2016/0314431 A1 | 10/2016 | Quezada | |
| 2016/0325933 A1 | 11/2016 | Stiernagle | |
| 2016/0327941 A1 | 11/2016 | Stiernagle | |
| 2016/0342931 A1* | 11/2016 | Muench | G06Q 10/083 |
| 2016/0347545 A1 | 12/2016 | Lindbo | |
| 2016/0355337 A1 | 12/2016 | Lert | |
| 2016/0364786 A1 | 12/2016 | Wankhede | |
| 2016/0371650 A1 | 12/2016 | Schmidt | |
| 2017/0027804 A1 | 2/2017 | Yu | |
| 2017/0036798 A1 | 2/2017 | Prahlad | |
| 2017/0043953 A1* | 2/2017 | Battles | G06Q 10/087 |
| 2017/0066592 A1 | 3/2017 | Bastian, II | |
| 2017/0068973 A1* | 3/2017 | Sinkel | G06Q 30/0201 |
| 2017/0088360 A1 | 3/2017 | Brazeau | |
| 2017/0113910 A1 | 4/2017 | Becchi | |
| 2017/0132559 A1 | 5/2017 | Jones | |
| 2017/0137222 A1 | 5/2017 | Lert, Jr. | |
| 2017/0137223 A1 | 5/2017 | Lert, Jr. | |
| 2017/0158430 A1 | 6/2017 | Raizer | |
| 2017/0166356 A1 | 6/2017 | Tubilla Kuri | |
| 2017/0166399 A1 | 6/2017 | Stubbs | |
| 2017/0183159 A1* | 6/2017 | Weiss | B66F 9/0755 |
| 2017/0185933 A1 | 6/2017 | Adulyasak | |
| 2017/0185955 A1 | 6/2017 | Hufschmid | |
| 2017/0200108 A1 | 7/2017 | Au | |
| 2017/0206480 A1 | 7/2017 | Naumann | |
| 2017/0213186 A1 | 7/2017 | Grifoni | |
| 2017/0220995 A1 | 8/2017 | Paulweber | |
| 2017/0228701 A1 | 8/2017 | Wosk | |
| 2017/0260008 A1 | 9/2017 | Dewitt | |
| 2017/0267452 A1 | 9/2017 | Goren | |
| 2017/0269607 A1 | 9/2017 | Fulop | |
| 2017/0285648 A1 | 10/2017 | Welty | |
| 2017/0297820 A1 | 10/2017 | Grinnell | |
| 2017/0301004 A1 | 10/2017 | Chirnomas | |
| 2017/0313514 A1 | 11/2017 | Lert, Jr. | |
| 2017/0316233 A1 | 11/2017 | Kherani | |
| 2017/0320102 A1 | 11/2017 | McVaugh | |
| 2017/0322561 A1 | 11/2017 | Stiernagle | |
| 2017/0323250 A1 | 11/2017 | Lindbo | |
| 2017/0330142 A1 | 11/2017 | Kanellos | |
| 2017/0330270 A1 | 11/2017 | Kanellos | |
| 2017/0334646 A1 | 11/2017 | High | |
| 2017/0369243 A1 | 12/2017 | Lert, Jr. | |
| 2017/0369244 A1 | 12/2017 | Battles | |
| 2018/0005173 A1 | 1/2018 | Elazary | |
| 2018/0005174 A1 | 1/2018 | Dixon | |
| 2018/0029797 A1 | 2/2018 | Hance | |
| 2018/0032949 A1 | 2/2018 | Galluzzo | |
| 2018/0068139 A1* | 3/2018 | Aalund | G06K 7/1413 |
| 2018/0068255 A1* | 3/2018 | Hance | G06Q 10/087 |
| 2018/0127212 A1* | 5/2018 | Jarvis | G05D 1/247 |
| 2018/0130015 A1* | 5/2018 | Jones | G06Q 10/083 |
| 2018/0134492 A1 | 5/2018 | Lert, Jr. | |
| 2018/0137452 A1 | 5/2018 | Khatravath | |
| 2018/0150793 A1 | 5/2018 | Lert, Jr. | |
| 2018/0182054 A1 | 6/2018 | Yao | |
| 2018/0211203 A1 | 7/2018 | Greenberg | |
| 2018/0237221 A1* | 8/2018 | Lindbo | A62C 2/247 |
| 2018/0237222 A1 | 8/2018 | Issing | |
| 2018/0300680 A1 | 10/2018 | Undernehr | |
| 2018/0314991 A1 | 11/2018 | Grundberg | |
| 2018/0319590 A1* | 11/2018 | Lindbo | B65G 1/0464 |
| 2018/0342031 A1 | 11/2018 | Tada | |
| 2019/0026770 A1 | 1/2019 | Murugesan | |
| 2019/0139637 A1 | 5/2019 | Ceh | |
| 2019/0197451 A1 | 6/2019 | Balasingham | |
| 2019/0389659 A1 | 12/2019 | Grinnell | |
| 2021/0032034 A1 | 2/2021 | Kalouche | |
| 2021/0224731 A1 | 7/2021 | Lert, Jr. | |
| 2021/0261335 A1 | 8/2021 | Lert, Jr. | |
| 2022/0274776 A1 | 9/2022 | Lert, Jr. | |
| 2022/0315333 A1 | 10/2022 | Lert, Jr. | |
| 2022/0343269 A1 | 10/2022 | Lert, Jr. | |

FOREIGN PATENT DOCUMENTS

| | | |
|---|---|---|
| DE | 3624033 | 8/1987 |
| DE | 102012100354 | 7/2013 |
| EP | 0302205 | 2/1989 |
| EP | 1348646 | 10/2003 |
| EP | 2650237 | 10/2013 |
| EP | 2651786 | 10/2013 |
| EP | 2651787 | 10/2013 |
| EP | 2995579 | 3/2016 |
| EP | 3056454 | 8/2016 |
| EP | 3855376 | 7/2021 |
| JP | H0642810 | 2/1994 |
| JP | H1135107 | 2/1999 |
| JP | 2002160813 | 6/2002 |
| JP | 2007246226 | 9/2007 |
| JP | 2019537183 | 12/2019 |
| JP | 2022008553 | 1/2022 |
| WO | 0068856 | 11/2000 |
| WO | 2005097550 | 10/2005 |
| WO | 2007067868 | 6/2007 |
| WO | 2010100513 | 9/2010 |
| WO | 20100118412 | 10/2010 |
| WO | 2014166640 | 10/2014 |
| WO | 2015005873 | 1/2015 |
| WO | 2016166294 | 10/2016 |
| WO | 2016172793 | 11/2016 |
| WO | 2016199033 | 12/2016 |
| WO | 2017064401 | 4/2017 |
| WO | 2018102444 | 6/2018 |
| WO | 2018156966 | 8/2018 |

OTHER PUBLICATIONS

CIPO; App. No. 3,049,022; Examiner Report mailed Jan. 20, 2023; (3 pages).
CIPO; App. No. 3,054,148; Examiner Report mailed Jan. 24, 2023; (5 pages).
CNIPA; App. No. 201780080099.2; Office Action mailed Jun. 29, 2023; (12 pages).
CNIPA; App. No. 201780080099.2; Office Action mailed Sep. 2, 2022; (13 pages).
EPO; App. No. 21163777.2; Office Action mailed Nov. 14, 2022; (7 pages).
IMPI; App. No. MX/a/2019/005988; Office Action mailed Jan. 10, 2023; (16 pages).
IMPI; App. No. MX/a/2019/005988; Office Action mailed Jul. 31, 2023; (17 pages).
International Search report for International Application No. PCT/US2017/063761 dated Feb. 19, 2018.
JPO; App. No. 2019-546194; Office Action mailed May 17, 2023; (5 pages).
JPO; App. No. 2019-548543; Notice of Allowance mailed Aug. 21, 2023; (40 pages).
JPO; App. No. 2021-156451; Office Action mailed Sep. 4, 2023; (5 pages).
PCT; App. No. PCT/US2017/063761; International Preliminary Report on Patentability mailed Jun. 19, 2019; (9 pages).
U.S. Appl. No. 17/223,714; Notice of Allowance mailed Jul. 31, 2023; (10 pages).
U.S. Appl. No. 17/240,777; Non-Final Rejection mailed Apr. 19, 2023; (18 pages).

(56) References Cited

OTHER PUBLICATIONS

U.S. Appl. No. 17/240,777; Notice of Allowance and Fees Due (PTOL-85) mailed Jan. 9, 2024; (2 pages).
U.S. Appl. No. 17/240,777; Notice of Allowance and Fees Due (PTOL-85) mailed Aug. 4, 2023; (9 pages).
U.S. Appl. No. 17/240,777; Notice of Allowance and Fees Due (PTOL-85) mailed Oct. 4, 2023; (9 pages).
U.S. Appl. No. 17/843,124; Office Action mailed May 23, 2023; (32 pages).
U.S. Appl. No. 15/826,045; Non-Final Rejection mailed Nov. 24, 2020; (25 pages).
U.S. Appl. No. 15/826,045; Non-Final Rejection mailed Nov. 20, 2019; (25 pages).
U.S. Appl. No. 15/826,045; Non-Final Rejection mailed Nov. 26, 2018; (28 pages).
U.S. Appl. No. 15/826,045; Final Rejection mailed Jun. 18, 2020; (24 pages).
U.S. Appl. No. 15/826,045; Final Rejection mailed Jul. 29, 2019; (24 pages).
U.S. Appl. No. 14/213,187; Notice of Allowance and Fees Due (PTOL-85) mailed May 20, 2015, (7 pages).
U.S. Appl. No. 14/213,187; Non-Final Rejection mailed Sep. 3, 2014; (5 pages).
U.S. Appl. No. 15/978,423; Notice of Allowance and Fees Due (PTOL-85) mailed Aug. 31, 2018, (8 pages).
U.S. Appl. No. 15/171,802; Final Rejection mailed Aug. 7, 2018; (9 pages).
U.S. Appl. No. 15/171,802; Notice of Allowance and Fees Due (PTOL-85) mailed Jan. 29, 2019, (8 pages).
U.S. Appl. No. 15/816,832; Non-Final Rejection mailed May 4, 2018; (27 pages).
International Search Report for International Application No. PCT/US2018/19537 dated Apr. 13, 2018.
U.S. Appl. No. 15/816,832; Non-Final Rejection mailed Apr. 30, 2020; (29 pages).
U.S. Appl. No. 15/867,373; Non-Final Rejection mailed May 20, 2020; (7 pages).
U.S. Appl. No. 15/816,832; Final Rejection mailed Nov. 2, 2018; (33 pages).
U.S. Appl. No. 15/816,832; Final Rejection mailed Nov. 1, 2019; (34 pages).
U.S. Appl. No. 15/816,832; Final Rejection mailed Oct. 19, 2020; (26 pages).
U.S. Appl. No. 15/171,802; Notice of Allowance and Fees Due (PTOL-85) mailed Oct. 9, 2018, (6 pages).
U.S. Appl. No. 15/903,993; Non-Final Rejection mailed Sep. 14, 2020; (26 pages).
U.S. Appl. No. 15/591,956; Non-Final Rejection mailed Sep. 14, 2020; (15 pages).
U.S. Appl. No. 16/121,212; Non-Final Rejection mailed Aug. 20, 2020; (13 pages).
U.S. Appl. No. 15/867,373; Notice of Allowance and Fees Due (PTOL-85) mailed Aug. 19, 2020, (7 pages).
U.S. Appl. No. 15/903,993; Notice of Allowance and Fees Due (PTOL-85) mailed May 15, 2020, (10 pages).
U.S. Appl. No. 15/903,993; Non-Final Rejection mailed Nov. 18, 2019; (33 pages).
U.S. Appl. No. 15/816,832; Non-Final Rejection mailed Apr. 15, 2019; (31 pages).
U.S. Appl. No. 15/421,208; Notice of Allowance and Fees Due (PTOL-85) mailed Mar. 20, 2019, (8 pages).
U.S. Appl. No. 15/867,373; Non-Final Rejection mailed Jun. 21, 2019; (6 pages).
U.S. Appl. No. 15/421,208; Notice of Allowance and Fees Due (PTOL-85) mailed Jan. 17, 2019, (8 pages).
U.S. Appl. No. 15/699,700; Notice of Allowance and Fees Due (PTOL-85) mailed Jan. 16, 2018, (7 pages).
U.S. Appl. No. 15/171,802; Non-Final Rejection mailed Feb. 12, 2018; (11 pages).
U.S. Appl. No. 15/421,239; Notice of Allowance and Fees Due (PTOL-85) mailed Jan. 19, 2018, (8 pages).
U.S. Appl. No. 15/867,373; Final Rejection mailed Dec. 5, 2019; (7 pages).
U.S. Appl. No. 15/421,239; Notice of Allowance and Fees Due (PTOL-85) mailed Oct. 5, 2017, (8 pages).
U.S. Appl. No. 15/421,208; Non-Final Rejection mailed Apr. 10, 2017; (14 pages).
U.S. Appl. No. 14/860,410; Notice of Allowance and Fees Due (PTOL-85) mailed Nov. 10, 2016, (8 pages).
U.S. Appl. No. 14/860,410; Non-Final Rejection mailed Jul. 20, 2016; (7 pages).
U.S. Appl. No. 14/860,410; Non-Final Rejection mailed Jan. 12, 2016; (8 pages).
U.S. Appl. No. 15/903,993; Notice of Allowance and Fees Due (PTOL-85) mailed Feb. 11, 2021, (17 pages).
U.S. Appl. No. 15/816,832; Notice of Allowance and Fees Due (PTOL-85) mailed Apr. 1, 2021, (10 pages).
U.S. Appl. No. 16/273,449; Non-Final Rejection mailed Dec. 24, 2020; (11 pages).
U.S. Appl. No. 15/816,832; Notice of Allowance and Fees Due (PTOL-85) mailed Jun. 9, 2021, (11 pages).
U.S. Appl. No. 15/591,956; Notice of Allowance and Fees Due (PTOL-85) mailed Jun. 4, 2021, (8 pages).
U.S. Appl. No. 15/591,956; Notice of Allowance and Fees Due (PTOL-85) mailed May 26, 2021, (8 pages).
U.S. Appl. No. 16/594,647; Final Rejection mailed Oct. 20, 2021; (17 pages).
U.S. Appl. No. 15/591,956; Final Rejection mailed Mar. 24, 2020; (14 pages).
U.S. Appl. No. 17/223,714; Non-Final Rejection mailed Feb. 2, 2023; (24 pages).
U.S. Appl. No. 17/745,627; Non-Final Rejection mailed Mar. 13, 2023; (6 pages).
USPTO; U.S. Appl. No. 17/499,783; Non-Final Rejection mailed Apr. 7, 2023; (7 pages).
Decision for Final Rejection dated May 27, 2021, and English language translation thereof, in Japanese Patent Application No. 2019-548543.
Office Action dated Dec. 5, 2022 in Japanese Patent Application No. 2021-156451.
USPTO; Non-Final Rejection mailed Jun. 18, 2021; (59 pages).
Office Action dated Sep. 14, 2022 in Japanese Patent Application No. 2019-546194.
Qi Ux, "Improving Responsiveness of Supply Chain through RFID Visibility Technology", 2009 IEEE/Informs International Conference on Service Operations, Logistics and Informatics, Chicago, IL. Jul. 22-24, 2009, pp. 513-517.
Harrison et al., "Intelligent distribution and logistics", IEE Proceedings—Intelligent Transport Systems, vol. 153, No. 2, pp. 167-180, Jun. 2006.
N. Viswanadham, "The past, present, and future of supply-chain automation", IEE Robotics & Automation Magazine, vol. 9, No. 2, pp. 48-56, Jun. 2002.
C Prasse et al., "How IoT will change the design and operation of logistics systems", 2014 International Conference on the Internet of Things (IOT), Oct. 6-8, 2014, pp. 55-60.
Leung et al., "Design of a Case-Based Multi-Agent Wave Picking Decision Support System for Handling E-Commerce Shipments", 2016 Portland International Conference on Management of Engineering and Technology (PICMET), Sep. 4-8, 2016, pp. 2248-2256.
International Search Report for International Application No. PCT/US2018/013203 dated Apr. 5, 2018.
Extended European Search Report dated Mar. 13, 2020 in European Patent Application No. 19217215.3.
International Search Report and Written Opinion dated Sep. 4, 2020 in International Patent Application No. PCT/US2020/033250.
Office Action dated Aug. 11, 2020 in Japanese Patent Application No. 2018-515183.
Office Action dated Nov. 25, 2020, with English language translation, in Japanese Patent Application No. 2019-526569.
Office Action dated Dec. 24, 2020, with English language translation, in Japanese Patent Application No. 2020-038556.

(56) References Cited

OTHER PUBLICATIONS

International Search Report for International Application No. PCT/US2017/062423 dated Feb. 5, 2018.
International Search Report and Written Opinion dated Sep. 6, 2017 in International Patent Application No. PCT/US2017/032171.
Extended European Search Report dated May 12, 2021 in European Patent Application No. 21163777.2.
International Search Report dated Oct. 7, 2016 in International Application No. PCT/ US2016/035547.
C. Wurll, "Mixed Case Palletizing with Industrial Robots," Proceedings of ISR 2016: 47st International Symposium on Robotics, Munich, Germany, pp. 1-6, Jun. 21-22, 2016.
IMPI App No. MX/a/2019/005988; Office Action mailed Dec. 14, 2023; 11 pages.
CIPO; U.S. Pat. No. 3,044,850; Office Action mailed Oct. 30, 2023; 5 pages.

* cited by examiner

AUTOMATED RETAIL SUPPLY CHAIN AND INVENTORY MANAGEMENT SYSTEM

CROSS-REFERENCE TO RELATED APPLICATIONS

This application is a continuation application of U.S. application Ser. No. 17/240,777, filed Apr. 26, 2021, which is a continuation application of U.S. application Ser. No. 15/826,045, filed on Nov. 29, 2017, which application claims the benefit of and priority to U.S. Provisional Application No. 62/427,652, filed on Nov. 29, 2016, which applications are all incorporated by reference herein in their entirety.

This application relates to U.S. Provisional Patent Application Ser. No. 62/423,614 entitled "Automated-Service Retail System and Method" and having a file date of Nov. 17, 2016, for all subject matter common to both applications. The disclosure of said provisional application is hereby incorporated by reference in its entirety.

FIELD OF THE INVENTION

The exemplary and non-limiting embodiments described herein relate generally to an automated retail supply chain storage and retrieval system, and more particularly to an inventory management system for use in supply chains in accordance with an illustrative embodiment.

BACKGROUND

In a chain of conventional self-service stores, the most cost-efficient method of replenishing store inventories, by far, is by the "case", that is, to supply stores with the shipping cases of products received from supplying manufacturers. The alternative is to replenish by the "each" or "eaches", i.e. to supply stores with individual product units in less-than-case quantities, but that method is so much more costly that universally the primary unit of replenishment in large-format stores like supermarkets and hypermarkets is by the cases shipped in pallet shipments.

In a conventional distribution model, the retailer receives pallets of cases at a distribution center ("DC"), the essential role of which is to replenish the inventories in a network of stores by periodically shipping to each store a specific set of cases of products that are needed (have been "ordered") by that store. In the vast majority of DCs, those orders are fulfilled using a manual case-picking process in which pallets of cases are arrayed in aisles and human operators travel from one product pallet to another to transfer from each the number of cases ordered by the store, placing the selected cases on an order pallet to be shipped to the store. In some DCs, automated case-picking systems are used, the most advanced of which use mobile robots, such as those described in U.S. Pat. No. 8,425,173. Whether the order-fulfillment process is manual or automated, however, the only unit of ordering available to the stores for almost all products is a case. This means that whenever a store needs to replenish its inventory of a given product (represented by a Stock Keeping Unit or "SKU"), it will receive at a minimum the number of eaches of that SKU that are contained in the standard shipping case supplied by the manufacturer, regardless of the velocity of movement that product typically experiences in the store. The term "SKU" is utilized herein to refer to a single product or good (aka, each). However, the present invention is not limited to only items that have SKUs, as would be appreciated by those of skill in the art. SKU is merely utilized herein in association with the selected illustrative embodiment for purposes of clarity of description.

While operationally efficient, case-level replenishment forces the retailer to carry considerably more inventory in their stores than would be required if the only replenishment consideration were the avoidance of out-of-stocks. The smallest replenishment quantity needed to prevent out-of-stocks depends on the speed and certainty of replenishment deliveries from the DC, and can be defined as the Minimum Safe Replenishment Quantity ("MSRQ") measured in number of average days of supply. While the number of eaches in an MSRQ is SKU-specific, the number of days of supply used to calculate MSRQs would typically be the same for all SKUs. For example, if a DC guarantees a delivery service-level of one day to a given store, the MSRQ for that store might only be four average days of supply, across all SKUs. An SKU that sells five units per day on average would therefore have an MSRQ of twenty eaches, but an SKU that sells only one unit per day would have an MSRQ of four eaches.

Except for a small number of "high-velocity" products, a typical shipping case of product might contain three weeks' worth or more of sales of that SKU. In other words, the store must allocate three to five times the amount of shelf space to that product than the minimum amount that would be needed purely to avoid out-of-stocks (e.g., the MSRQ for each product). Thus, if the store could reduce the replenishment quantity by a factor of three across all SKUs, the retailer could either reduce the size of its stores by two-thirds for the same assortment of products, or else increase the number of products offered by a factor of three.

SUMMARY

A method of supplying one or more goods to a physical store location is provided, the method comprising: receiving, at a distribution DC, the one or more goods from one or more suppliers, the distribution center (DC) comprising: a DC storage structure comprising a plurality of rack modules separated by aisles and having a plurality of storage levels, the DC storage structure storing a plurality of totes comprised of empty totes, product totes, or combinations thereof; and at least one DC mobile robot places totes into the DC storage structure, removing totes from the DC storage structure, and transporting totes throughout the storage structure; pickers at workstations depositing the one or more goods into an empty tote or a product tote, wherein when the one or more goods are placed into the empty tote the empty tote is then designated as a product tote and the one or more goods are designated as eaches, and when the one or more goods are placed into the product tote the one or more goods are designated as eaches; one of the at least one DC mobile robot transporting the product tote to the DC storage structure and placing the product tote into the DC storage structure for storage; and one of the at least one DC mobile robot retrieving the product tote from the DC storage structure and transporting the product tote to a shipping dock for shipment to a physical store, the physical store comprising: a building having an automated fulfillment section and a shopping section including a checkout section, and a delivery section; and the physical store receiving the product tote at the receiving section.

In one aspect, the physical store further comprises: a store storage structure comprising a plurality of rack modules separated by aisles and having a plurality of storage levels, the store storage structure storing a plurality of totes that are empty when empty storage totes, contain eaches when storage totes, contain orders when order totes, or combinations thereof; and at least one store mobile robot that propels itself horizontally and vertically throughout the store storage structure, placing totes into the store storage structure, removing totes from the store storage structure, and transporting totes.

In another aspect, an automated order fulfillment system at the physical store picks one or more fungible goods from the product tote eaches and organizes the one or more fungible goods into one or more order totes for delivery to customers in the physical store.

In another aspect, the method further comprises one or more sub-totes sized, dimensioned, and configured to fit within the empty tote and/or the product tote, and wherein a plurality of empty totes and/or product totes are sized, dimensioned, and configured to fit on a standard pallet.

In another aspect, a standard pallet comprises one or more of a North American pallet, a European pallet, an Australian pallet, or an Asian pallet.

In another aspect, the one or more sub-totes comprise one or more of ¼ sub-totes, ½ sub-totes, and/or ¾ sub-totes.

In another aspect, the step of the pickers at workstations depositing the one or more goods into an empty tote or a product tote further comprises the one or more goods being placed into the one or more sub-totes.

In another aspect, when the one or more goods are placed into the empty tote the one or more goods are placed within one or more sub-totes within the empty tote, and when the one or more goods are placed into the product tote the one or more goods are placed within one or more sub-totes within the product tote.

In another aspect, eaches contained in a single product tote have different stock keeping units (SKUs).

In another aspect, eaches contained in a single sub-tote have the same SKUs.

In another aspect, eaches contained in a single product tote have different SKUs.

In another aspect, eaches contained on a single pallet have different SKUs.

In another aspect, the step of receiving, at the DC, the one or more goods from one or more suppliers, further comprises de-trashing shipment cases from suppliers at decanting workstations of the DC.

In another aspect, the receiving, at the DC, the one or more goods from one or more suppliers further comprises the at least one mobile robot transporting shipping cases from the shipping dock to a decanting workstation.

In another aspect, the method may further comprise: tracking a number and location of eaches contained in each of the product totes in real time according to SKU; and instructing one of the pickers to allocate a predetermined quantity of eaches into the product tote.

In another aspect, the predetermined quantity of eaches is determined based on an inventory requirement at an associated automated store.

In another aspect, the inventory requirement is based on an automated real-time inventory count, based on SKUs, at the associated automated store.

In another aspect, the inventory requirement is based on a human order from the associated automated store.

In another aspect, the inventory requirement is based on a sales history at the associated automated store.

In another aspect, the pickers are human.

In another aspect, the pickers are mobile robots.

In accordance with another aspect, a method is provided, comprising: a DC storage structure comprising a plurality of rack modules separated by aisles and having a plurality of storage levels, the DC storage structure storing a plurality of totes comprised of empty totes, product totes, or combinations thereof; and at least one DC mobile robot places totes into the DC storage structure, removing totes from the DC storage structure, and transporting totes throughout the storage structure; the DC receiving, from a physical store, a request for replenishment of a desired quantity of eaches that is less than a quantity conventionally required to fill a pallet of eaches; tasking the at least one DC mobile robot to retrieve one or more sub-totes from the DC storage structure containing the desired quantity of eaches, the at least one DC mobile robot retrieving the one or more sub-totes and placing them in one or more product totes for delivery to the physical store.

In accordance with another aspect, the method further comprises the at least one DC mobile robot transporting the one or more product totes to a shipping dock for pickup and transfer to the physical store.

In accordance with another aspect, eaches contained in a single product tote of the one or more product totes have different stock keeping units (SKUs).

In accordance with another aspect, eaches contained in a single sub-tote of the one or more sub-totes have the same SKUs.

In accordance with another aspect, the method further comprises the physical store receiving the one or more product totes at a receiving section.

In accordance with another aspect, the physical store comprises a building having a receiving section, an automated fulfillment section, a shopping section including a checkout section, and a delivery section.

In accordance with another aspect, the method further comprises the physical store receiving the product tote at the receiving section.

In accordance with another aspect, an automated order fulfillment system at the physical store picks one or more fungible goods from the product tote eaches and organizes the one or more fungible goods into one or more order totes for delivery to customers in the physical store.

In accordance with another aspect, a plurality of physical stores are in networked communication with the DC, enabling replenishment of eaches based on real-time demand from the plurality of physical stores and wherein the plurality of physical stores utilize sub-totes and totes of a standardized size.

In accordance with another aspect, the method is fully automated without human interaction.

BRIEF DESCRIPTION OF THE DRAWINGS

These and other characteristics of the present disclosed embodiments will be more fully understood by reference to the following detailed description in conjunction with the attached drawings, in which.

DETAILED DESCRIPTION

Figure 1:
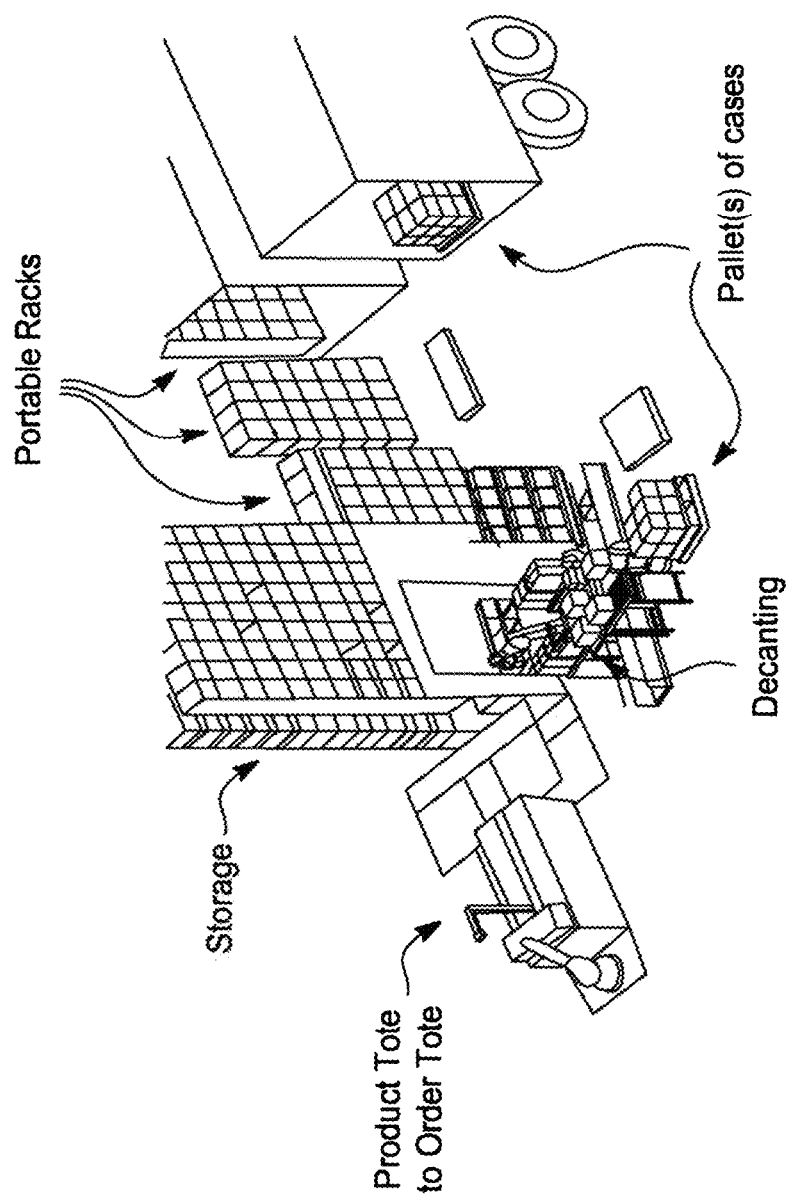
FIG. 1 shows a schematic of an automated distribution center in accordance with an example embodiment of the present invention.

FIGS. 1-6B illustrate example embodiments of a method and system according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Compared to a self-service store, the automated retail store as taught in U.S. Provisional Patent Application Ser. No. 62/423,614 entitled "Automated-Service Retail System and Method" filed Nov. 17, 2016, (hereby incorporated by reference herein in its entirety), enables dramatic increases in both space and labor efficiencies in the construction and the operation of a retail store, due to the replacement of the self-service packaged-goods market with a robotic each-pick system such as the one taught in "Storage and Retrieval System". A key element of that each-pick system is the "Tote/Sub-tote" containment architecture in which the primary storage container ("tote") can be subdivided into multiple compartments that each contain a different product through the use of a secondary container ("sub-tote"). The key reason for this architecture, in preference to the widely used alternative method of divider partitions, is that the totes and sub-totes are designed to be manipulated by robots, so that eaches can be transferred between totes simply by transferring the sub-totes containing said eaches.

This capability also makes possible a completely automated method of replenishing a network of retail stores, especially a network of automated retail stores, that is a significant improvement over the conventional method of replenishing stores with the shipping cases of products received from the manufacturers.

Because inventory is relatively high in traditional storage facilities based on case level inventory storage and other inefficiencies, the replenishment times or frequencies are long, whereas with the present embodiment inventory may be smaller and replenished more frequently and with more granularities, such that inventory accuracy is improved with reduced inventory levels as will be described herein. The present example embodiment reduces inventory and associated storage space requirements by leveraging a tote/sub-tote containment architecture of the automated each-picking system used in automated stores to change the process of fulfilling store-replenishment orders at the DC. In accordance with an example embodiment of the present invention, the DC is an automated DC. In the method and system of the present invention, cases of product arriving on pallets from one or more suppliers or supplying manufacturers are first opened and the contained eaches are transferred to sub-totes at one or more decanting workstations. This process is called "decanting" and is preferably performed as soon as cases are received at the DC. While not essential to the disclosed embodiment, it may be advantageous to automate this decanting process so that robots perform the transfer of goods from the cases to the sub-totes rather than humans. As would be appreciated by one skilled in the art, the present invention is configured to perform automated, semi-automated, or human decanting.

Upon completion of the decanting process, the sub-totes filled during the decanting process are loaded into "product totes". Since multiple cases of the same goods or SKUs will be typically be decanted consecutively (having arrived on the same pallet), these product totes will typically be single product or single SKU totes. That is, all of the eaches in the tote will be the same SKU, though they will typically be distributed over multiple sub-totes within the tote.

A feature of the example embodiment is that the eaches of a given SKU can be decanted into multiple sizes of sub-totes, such that they are not limited to a single size sub-tote. The replenishment quantity for each SKU can therefore vary by store based on a calculated MSRQ for that SKU in each store. A further feature of the example embodiment is that the sub-totes contain some number of eaches less than an amount that comes shipped in a case, and including down to a single each per sub-tote.

In accordance with an example embodiment of the present invention, once a tote has been filled to capacity with product, it is then transferred by mobile robots from the decanting workstation and placed into a DC storage structure where the inventory remains available to fill replenishment orders from remote stores. The order-fulfillment process for those orders is nearly identical to the each-picking process performed at the store to fulfill customer orders, as discussed in U.S. Provisional Patent Application Ser. No. 62/423,614 incorporated herein. In particular, mobile robots bring product totes ("P-totes"), from the storage structure, and order totes ("O-totes") to a workstation where eaches are transferred from the P-totes to O-totes. The difference is that in this example embodiment the transfer is performed by a mobile robot handling sub-totes containing the eaches instead of human or robotic pickers handling eaches directly. As would be appreciated by one skilled in the art, this process can similarly be performed by human pickers without departing from the scope of the present invention.

The fulfilled O-totes, each typically containing multiple SKUs contained in multiple single SKU sub-totes, are shipped from the DC to a network of automated stores supported by the DC. At each store, the delivered O-totes are received as P-totes and inducted directly into the automated each-pick system operating within the store, where they are held in storage ready to allocate eaches to fill customer orders as discussed in U.S. Provisional Patent Application Ser. No. 62/423,614 incorporated herein.

The automated retail supply chain of the present example embodiment includes an automated DC and a network of automated retail stores which are supplied with replenishment inventory from the DC. FIG. 1 shows in schematic form an automated DC, the details of which are described in greater detail below.

Figure 2:
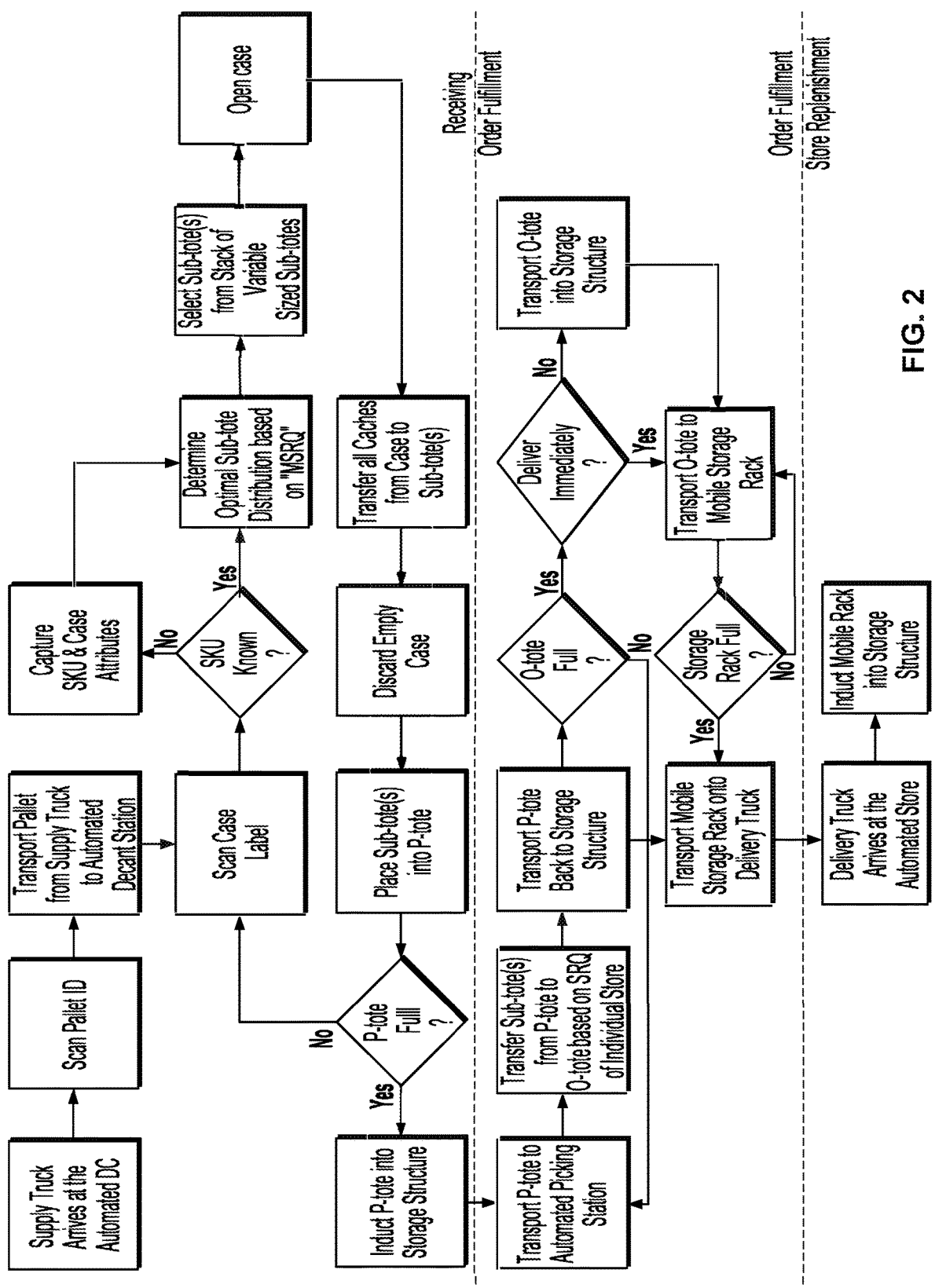
FIG. 2 is a flow-chart showing the flow of product through a retailer's supply chain under the present disclosed embodiment.

FIG. 2 shows the flow of product through the automated retail supply chain according to the example embodiment. The product flow starts with the arrival at the automated DC of pallets containing cases shipped by one or more suppliers. Typically, the pallets are single product or single SKU pallets, i.e. all cases of product are the same SKU. As would be appreciated by one skilled in the art, some pallets can be "rainbow" pallets comprising multiple single-SKU layers, but this minor complexity in the process is ignored for purposes of this disclosure. Upon arrival, operators must validate that the SKU is known, i.e. the identity and other attributes of the product have been captured previously in the system, and that the actual product received are consistent with those registered SKU attributes. This step is substantially similar or identical to what happens in a manual or automated case-picking DC supporting self-service stores, but after SKU validation the current disclosed embodiment departs from such stores. The second step in the flow is to send the received cases immediately to a decanting workstation, where they are transferred into sub-totes, which are themselves contained within totes.

The flowchart illustrates where a truck or other suitable transport may arrive at a distribution center, for example, with eaches of goods in cases on pallets. The pallets may be scanned to identify case information. A decision is made as to what type of decanting workstation the pallet is to be directed and the pallet is directed to the appropriate decanting workstation. For example, the decanting workstation can be one of a manual, automatic, or semi-automatic decanting workstation. A first robot transfers case(s) from the pallet to a box opener where the box is automatically opened/cut and the first robot disposes of the top of the case. A second robot selects the correct corresponding size sub-tote and places the sub-tote in a tote (e.g., a product tote). The second robot then place eaches from the open case into the sub-tote and when the tote is full of filled sub-totes a mobile robot stores the completed (or partially completed) tote in the storage rack system. The selection of sub-tote size(s) and/or mix of sizes can be a function of the product velocity requirements for a given store to be supplied. For example, mixes of sub-tote sizes may be provided as a function of different stores to be supplied based on product velocity requirements of those stores. Each of these steps is represented in the flow of FIG. 2 as shown above the receiving line.

When an order is received from a given store for goods or creating demand for goods, the order fulfillment process depicted in FIG. 2 is initiated. The order fulfillment begins with a mobile robot being dispatched to transport an empty (or partially empty) order tote to the picking workstation. Other mobile robots may then (or concurrently or otherwise) bring product totes with the sub-totes to the picking workstation where a picking robot transfers entire sub-totes to the order tote(s) to fulfill the order. As would be appreciated by one skilled in the art, the sub-totes may be mixed based on the desired amount of inventory required for a given store. In accordance with an example embodiment of the repent invention, a decision is provided with respect to when the order is needed and/or when the order tote ships, whether the order tote is to be directed to a portable rack if the order tote is needed immediately, or if the order tote is to be directed to short/long term storage if the order tote is needed in the future. When a given portable rack is full or at the appropriate level to meet one or more order(s), it may be released to a given truck or transport for transportation to a networked store. In accordance with an example embodiment of the repent invention, the order totes or racks may be directed to storage or the truck or transport based on a determination as to whether a truck or transport is currently available. The flowchart is illustrative of a potential sequence as described herein and within the chart where alternative combinations may be provided. Here, scheduling and dispatching decisions of product totes, order totes and otherwise may be made based on order and sub tote size and the timing of an order receipt and when the order needs to be fulfilled and optimized.

Figure 3A:
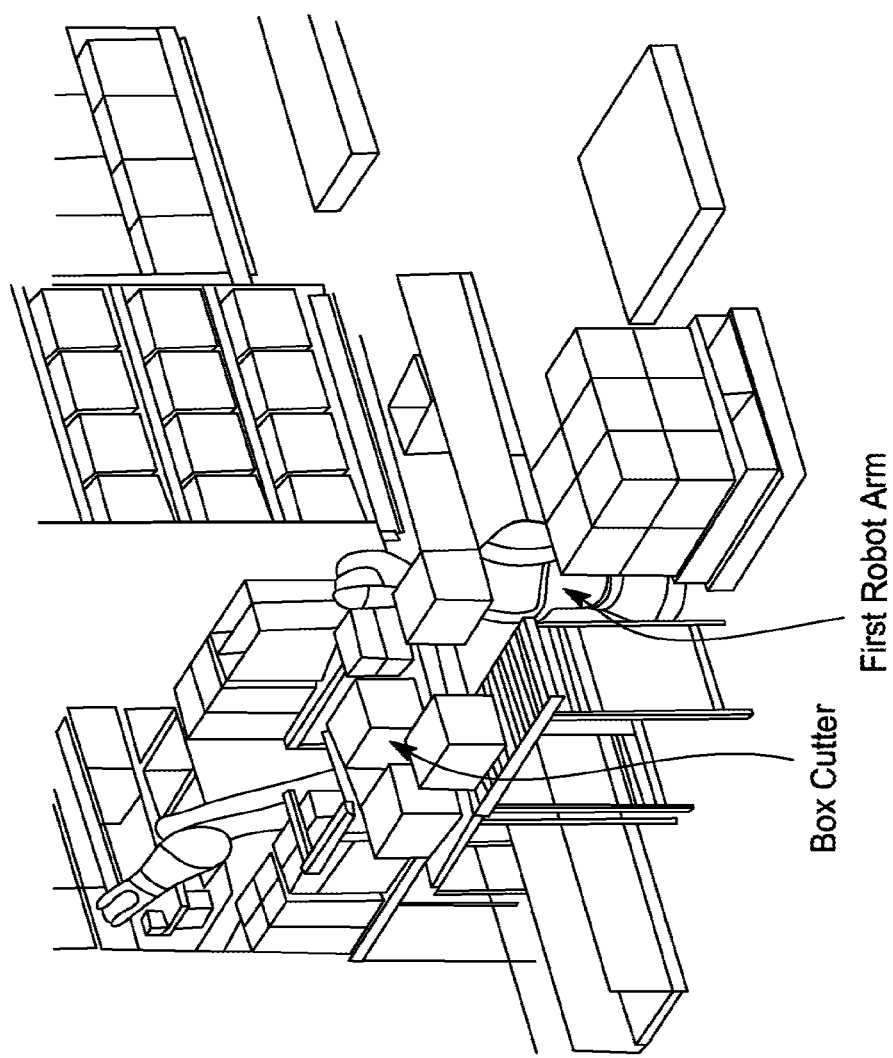
FIG. 3A and FIG. 3B show an automated decanting workstation within the distribution center.
Figure 3B:
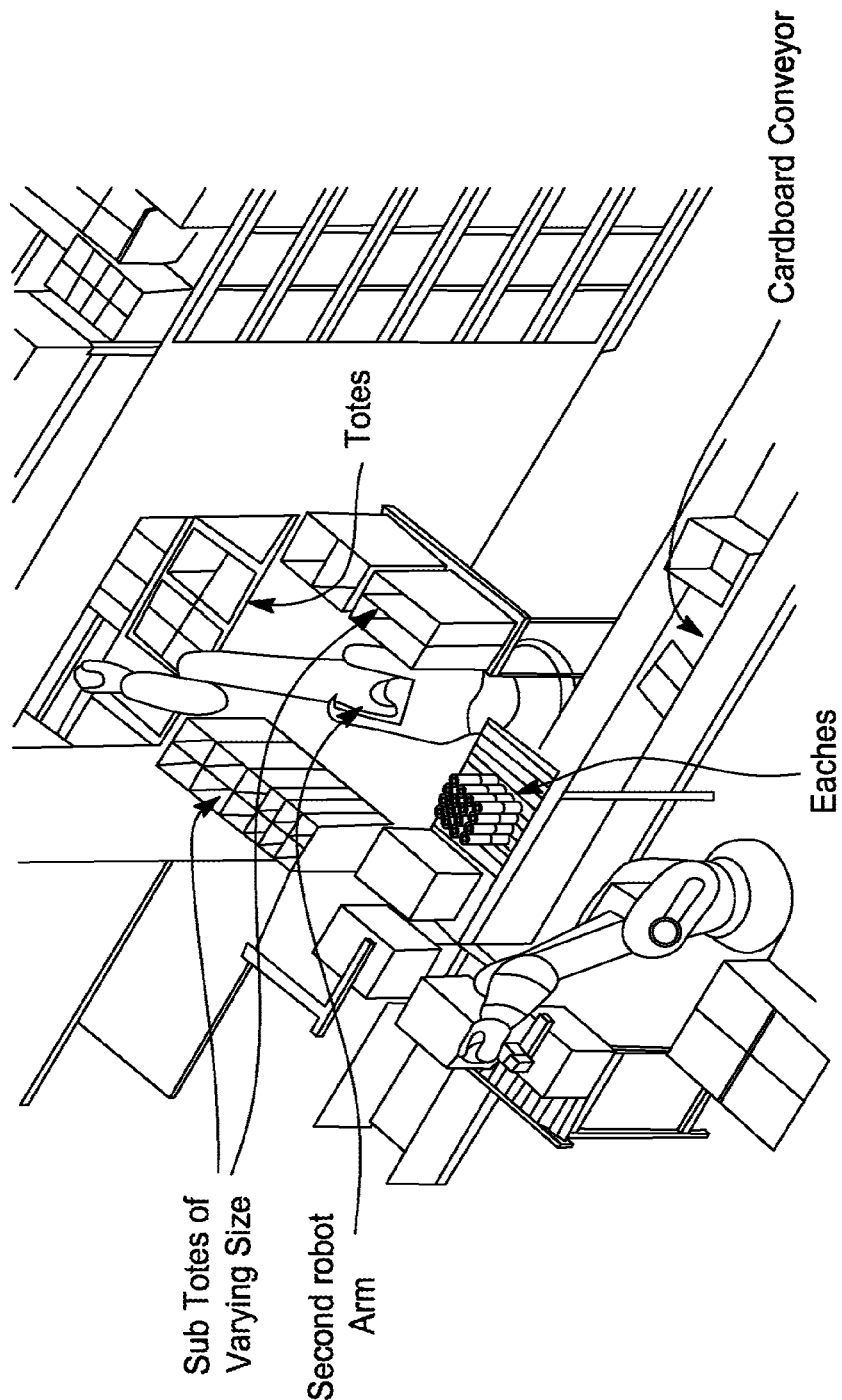

FIG. 3A and FIG. 3B show detailed representations of the decanting workstation. As shown in FIG. 3A, a mobile pallet robot transfers a pallet with cases of goods to a decanting workstation. When exiting the truck, bar code scanners, radio frequency identification (RFID) readers or other identification technology is used to identify the cases and their contained eaches of goods. The destination decanting workstation may be selected based on the cases and/or eaches the decanting workstation is best configured to handle, as discussed with respect to FIG. 2.

In accordance with an example embodiment of the present invention, a first articulated arm robot uses a camera mounted on its distal link to identify the position of cases situated on the pallet. The first robot adjusts its variable width gripper to the size of the case previously identified, and uses its camera to grip and lift a case from the pallet and place it onto a first conveyor.

The case is conveyed into a box cutter that uses blades on a rotating head to cut along the bottom perimeter of the case. The box cutter uses the identification of the case, along with a camera to guide the rotating head around the perimeter of the case. Alternatively, the box cutter may use stationary blades that cut the bottom of the box as it is conveyed in two orthogonal directions through the box cutter.

Once the case is cut along its bottom perimeter, it is conveyed onto a second orthogonal conveyor where the top and sides of the case are lifted upward and off by the first articulated arm robot. The first robot disposes the top and sides of the case onto a third cardboard conveyor shown underneath the second conveyor. Thereafter, the cardboard is transported on a third conveyor to a location where it is collected to be recycled.

A second articulated arm robot uses a variable width end-effector to load a sub-tote, from stacks of variable sized sub-totes, and places the selected sub-tote into a tote. The size of the sub-tote selected corresponds to the identification of the eaches to be transferred and the desired quantity of eaches to be stored within a sub-tote. For example, the quantity of eaches placed in a sub-tote is calculated based on the inventory rules and velocity of the particular eaches at the retail stores served by the automated DC. Sub-totes of varying size and configuration may be placed within a tote to maximize storage density and decanting efficiency. The identification mark (e.g. alphanumeric or bar code) is read by the camera mounted on the second robot and stored.

Once the sub-tote is placed into the tote, the second robot adjusts its variable pitch vacuum cup gripper to the eaches to be picked. The second robot uses a camera mounted on its distal link to position the grip and transfer the eaches from the opened case into the sub-tote. As would be appreciated by one skilled in the art, each picking grippers other than vacuum may be alternatively used by the second robot (e.g. mechanical, conformal, etc.). The second robot may also be configured to automatically change gripper types based on the eaches to be transferred.

After all eaches are transferred from the open case, the second conveyor transports the bottom of the case off of its end, and down onto the third cardboard transporting conveyor.

A key feature of the example embodiment of the present invention is the ability to load the eaches of a given SKU into sub-totes of different sizes at the decanting workstation(s), which allows the replenishment quantity of each SKU to vary by store. In accordance with an example embodiment of the present invention, a standard replenishment quantity ("SRQ") can be calculated for each SKU for each store, based on an MSRQ for that SKU/store. As an example, if a ⅛-sub-tote can hold four eaches of a given SKU ("XYZ"), a ¼ sub-tote can hold eight eaches of that SKU, and a ½ sub-tote can hold sixteen eaches of that SKU. Furthermore, in this example, the MSRQ for all stores supported by a given DC is five average days of supply across all SKUs. In this example, then, the SRQ for SKU XYZ will be a ⅛ sub-tote containing four eaches for all stores that sell no more than 5.6 XYZ eaches per week (4/(5/7)=5.6). For all stores that sell between 5.7 and 11.2 eaches per average week, the SRQ would be a ¼ sub-totes containing eight eaches, and stores that sell between 11.3 and 22.4 XYZ eaches per average week would use an SRQ of ½ sub-totes when ordering SKU XYZ from the DC. Note that the SRQ can also be a combination of multiple sub-totes. For example, if a store sells between 22.5 and 28.0 eaches per average week of SKU XYZ, the SRQ would be a combination of ½ sub-tote containing sixteen eaches plus a ⅛ sub-tote containing four eaches.

In accordance with an example embodiment of the present invention, the distribution of sub-tote sizes into which a total number of eaches of a given SKU are loaded at the decanting workstation should generally align with the distribution of sub-tote sizes produced by summing all of the SRQs for that SKU across all stores supported by the DC. For example, if there are one-hundred stores supported by a DC, and a summation of all of the sub-tote sizes in the SRQs for those stores for SKU XYZ yields forty ⅛-sub-totes, sixty ¼-sub-totes, and ten ½-sub-totes, when cases of SKU XYZ are being decanted, then, 36% of the sub-totes into which the eaches are loaded should be ⅛-sub-totes (40/110=0.36), 55% should be ¼-sub-totes (60/110=0.55), and 9% should be ½-sub-totes (10/110=0.09).

The next step in the material flow according to the illustrative embodiment is to place totes loaded with filled sub-totes into the storage structure, and this step is performed by one or more mobile robots. In particular, once a tote is filled with sub-totes containing eaches, the filled tote is retrieved and placed in the storage structure or rack by a mobile robot as described in U.S. patent application Ser. No. 15/171,802 having a filing date of Jun. 2, 2016 and entitled "Storage and Retrieval System" hereby incorporated by reference herein in its entirety. These Totes may be the product totes used in the order-fulfillment process.

The next step in the material flow is the order-fulfillment process in which replenishment sub-totes are transferred from product totes to order totes, and this process is also performed entirely robotically.

Figure 4:
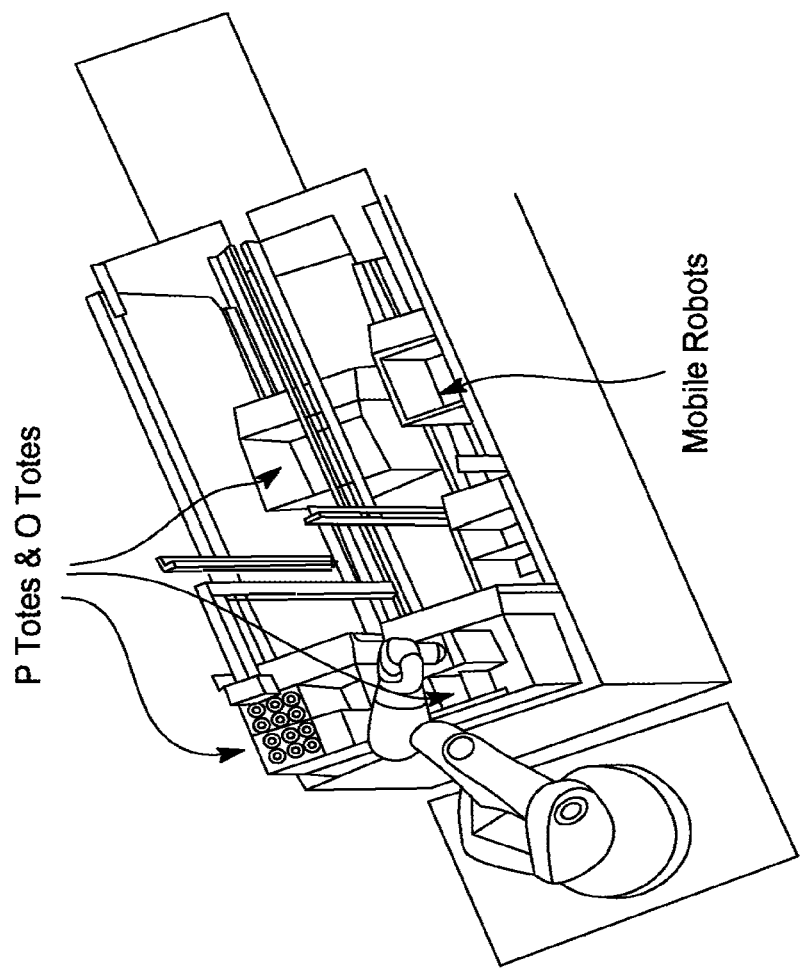
FIG. 4 shows an automated Sub-tote-picking workstation within the distribution center.

The mobile robots deliver the totes (the product totes) containing sub-totes containing eaches to a picking workstation as shown in FIG. 4. mobile robots also deliver empty totes (the order totes) to the picking workstation. A third articulated arm robot is used to transfer ordered sub-totes containing eaches to the empty order tote. Once an order tote has been filled with sub-totes containing eaches, a mobile robot can either store the tote in the storage structure or transport it directly to a temporarily affixed portable storage rack, shown in FIGS. 5A and 5B.

The next step in the material flow according to the present disclosed embodiment is to ship the filled replenishment totes from the DC to the stores.

Figure 5A:
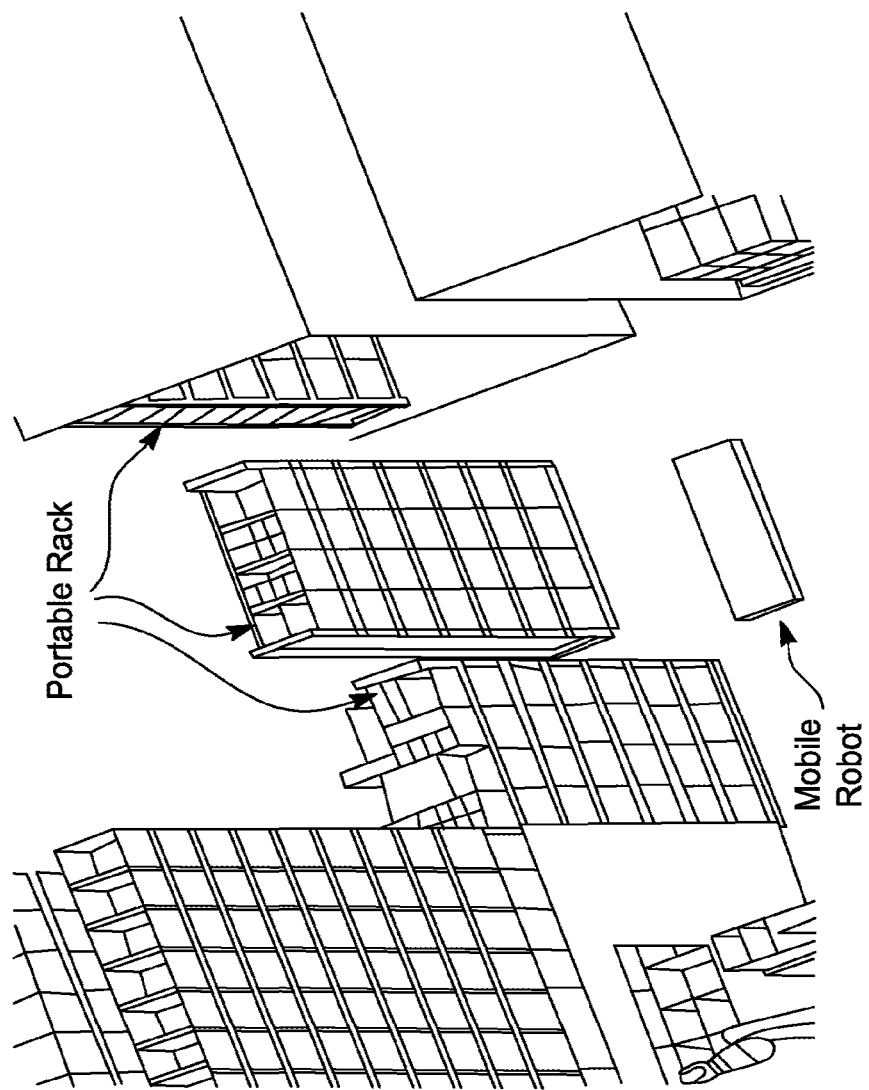
FIG. 5A and FIG. 5B show details of the I/O interface at the distribution center, including the portable racks that hold the replenishment P-Totes for transport to the automated stores.

FIG. 5A shows a portable rack temporarily affixed to the storage structure, a portable storage rack being transported to a truck, and a portable storage rack located within a truck destined for a retail store. A mobile robot is shown transferring a loaded tote to the portable rack temporarily affixed to the storage rack.

The portable storage racks are transported using a mobile rack robot configured to move the portable storage racks. In particular, the mobile rack robot positions itself underneath the portable storage rack, lifts the portable storage rack slightly, and uses computer navigation to move the portable storage rack to a destination. The mobile rack robot is capable of entering the space underneath the portable storage rack either between its support legs at its narrow end, or between its support legs along its length. The mobile rack robot may alternatively be controlled by a human operator.

The portable storage rack may alternatively be manually transported on wheels attached to it, or using a human-guided wheeled lift.

The open side of the portable storage rack where mobile robots are able to load totes that have latches that secure totes from sliding out of their storage position when not affixed to the storage structure. Moreover, the top of the trailer may have beams along the length of the trailer which help guide the portable storage racks into the trailer and prevent them from tipping during transport.

Figure 5B:
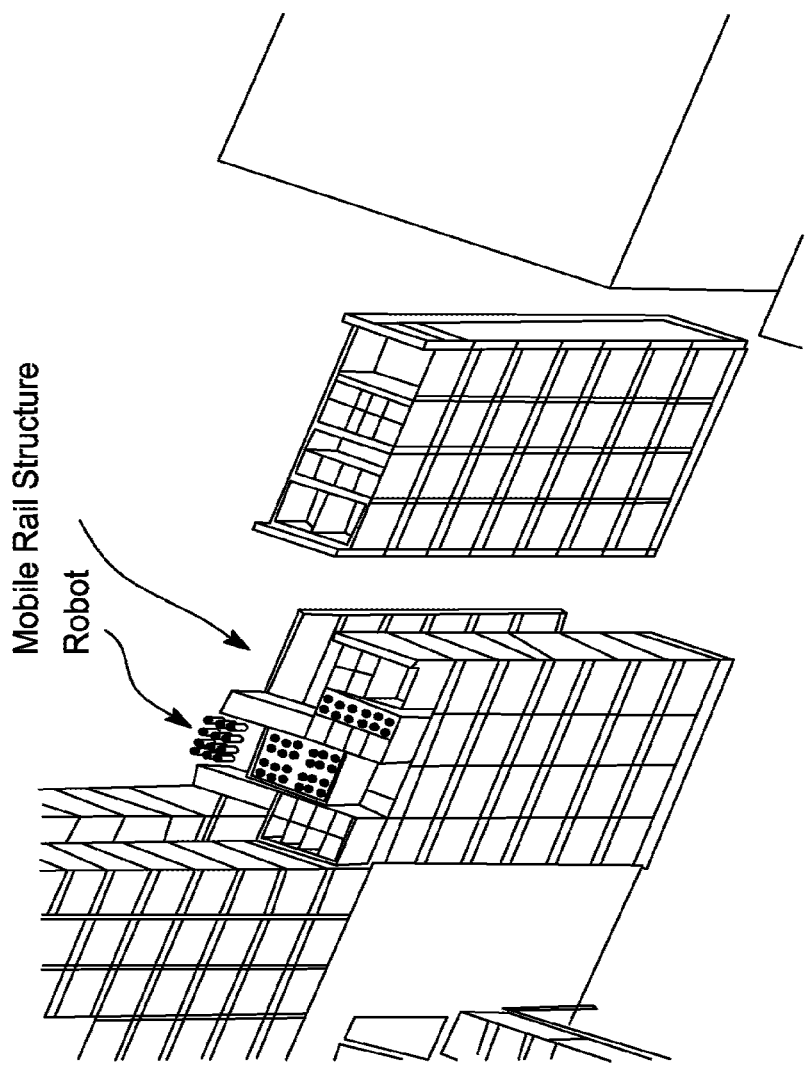

FIG. 5B shows the rail structure that the mobile robots travel on when placing or picking totes from the portable storage racks. Registration features such as registration pins or kinematic couplings may be positioned at the bottom of the rail structure to correctly position the portable storage rack to the rail structure and storage structure.

The rail structure and storage structure at the retail store contain the same registration features to permit the portable storage rack to be quickly and accurately aligned with it, and totes transferred into the storage structure. After the incoming full totes have been transferred in the store's storage structure, empty totes with empty sub-totes can be transferred onto the portable storage rack for transport back to the automated DC.

In the scenario where ample space is not available to transport the totes and sub-totes back to the automated DC on the portable storage rack, the store may nest the sub-totes and totes using an automated picking workstation normally used for picking eaches or transferring sub-totes between totes to increase storage density, i.e. defragmenting the stored sub-totes. The nested totes and sub-totes may be placed on the truck for delivery back to the automated DC.

Once at the retail the store, the portable storage rack is removed from the truck and affixed to the storage structure at the store. At the store, mobile robots transfer the totes with sub-totes containing eaches into the storage structure of the automated each picking system operating within the store.

The remaining steps in the product flow according to the disclosed embodiment involve the fulfillment of customer orders at each-picking workstations, and the transfer of completed orders to customers, as described in U.S. patent application Ser. No. 15/171,802 having a filing date of Jun. 2, 2016 and entitled "Storage and Retrieval System" which is hereby incorporated by reference in its entirety.

While the decanting workstation, picking workstation, storage rack and portable rack are all illustrated and described as singular for simplicity, it is expected an automated distribution center contains multiples of each that interact.

Figure 6A:
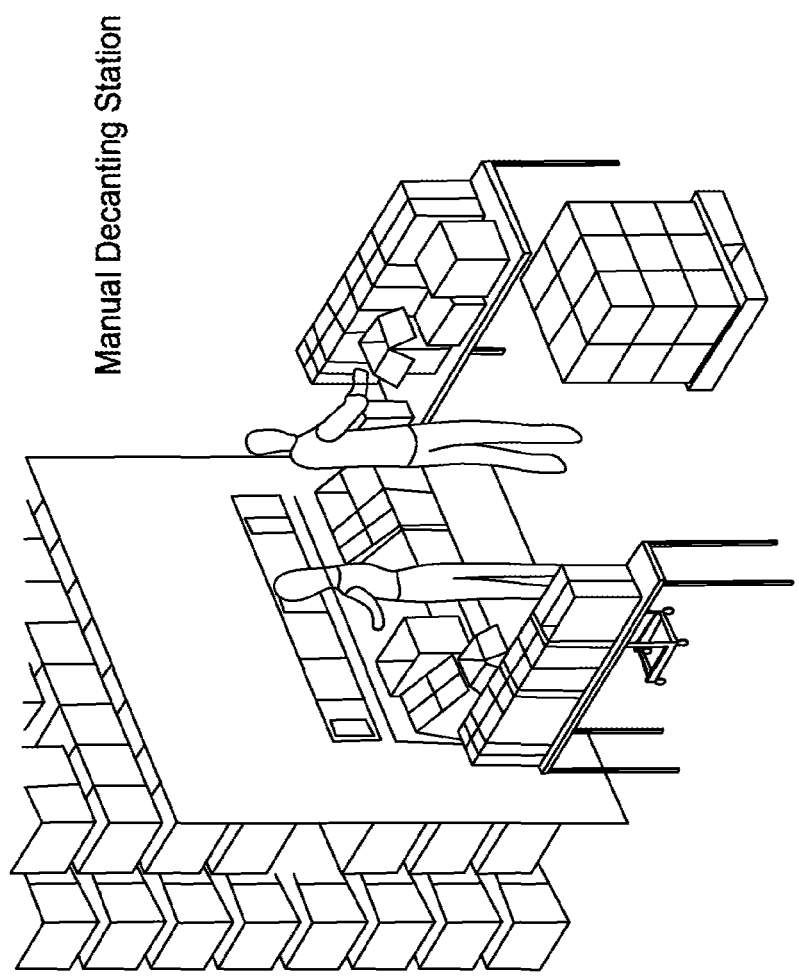
FIG. 6A and FIG. 6B show details of a semi-automatic or manual decanting workstation.
Figure 6B:
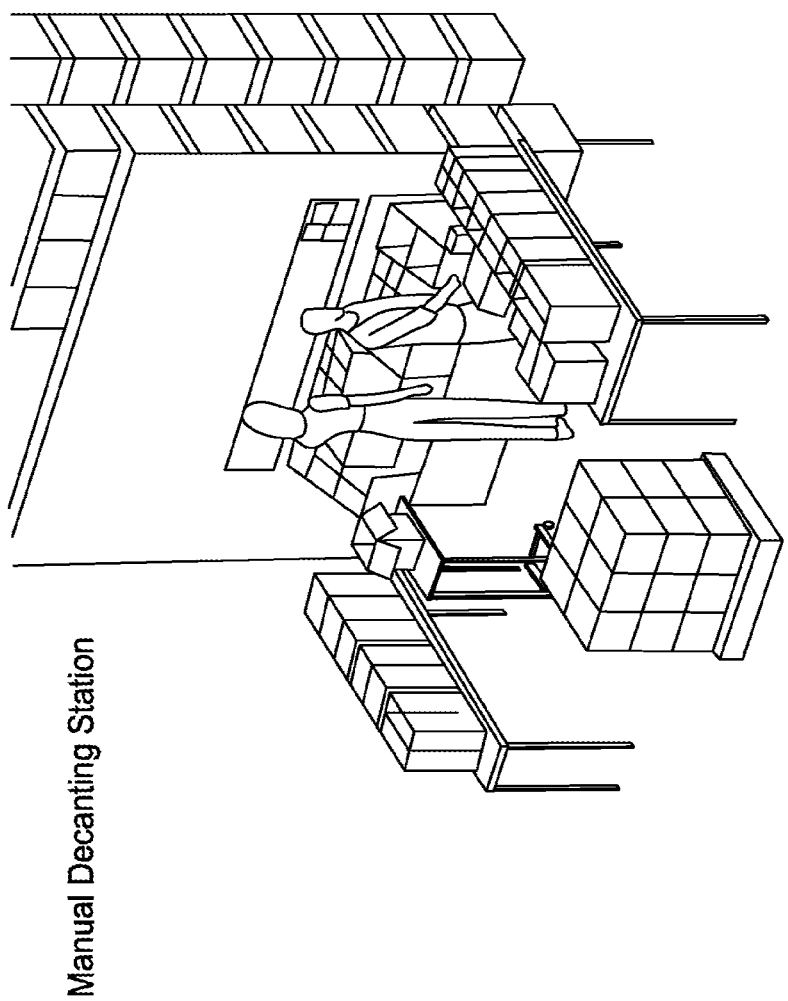

FIGS. 6A and 6B show a manual decanting workstation. Essentially everywhere the articulated robots are provided, humans may be provided alone or in combination, and the pallet and rack mobile robots could be replaced with "pallet jacks" pulled by humans. The robot least easily replaced by a human may be the mobile robot due to speed and volume constraints among others.

As utilized herein, the terms "robot" and "bot" are utilized interchangeably herein in accordance with their conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications is reserved. Within this specification embodiments have been described in a way which enables a clear and concise specification to be written, but it is intended and will be appreciated that embodiments may be variously combined or separated without parting from the invention. It is intended that the present invention be limited only to the extent required by the applicable rules of law.

What is claimed is:

1. An order fulfillment system for distribution centers supplying goods to physical store locations, the order fulfillment system comprising:
    a decanting station for receiving a plurality of types of goods into a distribution center, the decanting station configured to transfer one type of good into a plurality of sub-totes that are configured to fit within one or more product containers;
    a picking workstation configured to transfer one or more of the plurality of sub-totes from the one or more product containers to one or more order containers, the one or more of the plurality of sub-totes being selected based on an inventory requirement for the one type of good at a physical store location; and
    a delivery section for transferring the one or more order containers to a shipping vehicle for shipment to the physical store location.

2. The order fulfillment system of claim 1, further comprising a storage section configured to store the one or more product containers after the one type of good is loaded into the one or more product containers and before the one or more product containers are transferred to the picking workstation.

3. The order fulfillment system of claim 1, further comprising a decanting robot for automatically loading the one type of good into the plurality of sub-totes at the decanting station.

4. The order fulfillment system of claim 1, wherein the one type of good is manually decanted at the decanting station.

5. The order fulfillment system of claim 1, further comprising a picking robot configured to automatically grip sub-totes of differing sizes and transferring the one or more of the plurality of sub-totes having the one type of good as a whole from the one or more product containers to the one or more order containers.

6. The order fulfillment system of claim 1, wherein sub-totes are manually transferred as a whole from product containers to order containers.

7. The order fulfillment system of claim 1, wherein the plurality of sub-totes comprise differing sizes of sub-totes.

8. The order fulfillment system of claim 7, wherein a combination of two or more sub-totes of differing sizes corresponds to the inventory requirement for the one type of good at the physical store location.

9. The order fulfillment system of claim 1, further comprising a plurality of mobile robots configured to transfer product containers from the decanting station, configured to transfer product containers to the picking workstation, and configured to transfer empty product containers away from the picking workstation.

10. The order fulfillment system of claim 9, wherein the plurality of mobile robots are further configured to transfer order containers to the picking workstation, configured to transfer order containers from the picking workstation, and configured to transfer order containers to the delivery section.

11. A method of order fulfillment for distribution centers supplying goods to physical store locations, the method comprising:
    at a decanting station, receiving a plurality of types of goods into a distribution center;
    at the decanting station, transferring one type of good into a plurality of sub-totes and fitting the plurality of sub-totes into one or more product containers;
    at a picking workstation, transferring one or more of the plurality of sub-totes from the one or more product containers to one or more order containers and selecting the one or more of the plurality of sub-totes being based on an inventory requirement for the one type of good at a physical store location; and
    at a delivery section, transferring the one or more order containers to a shipping vehicle for shipment to the physical store location.

12. The method of claim 11, further comprising storing the one or more product containers at a storage section after the one type of good is loaded into the one or more product containers and before the one or more product containers are transferred to the picking workstation.

13. The method of claim 11, further comprising, by a decanting robot, automatically loading the one type of good into the plurality of sub-totes at the decanting station.

14. The method of claim 11, further comprising manually decanting the one type of good at the decanting station.

15. The method of claim 11, further comprising, by a picking robot, automatically gripping sub-totes of differing sizes and transferring the one or more of the plurality of sub-totes having the one type of good as a whole from the one or more product containers to the one or more order containers.

16. The method of claim 11, further comprising manually transferred sub-totes as a whole from product containers to order containers.

17. The method of claim 11, wherein the plurality of sub-totes comprise differing sizes of sub-totes.

18. The method of claim 17, wherein a combination of two or more sub-totes of differing sizes corresponds to the inventory requirement for the one type of good at the physical store location.

19. The method of claim 11, further comprising, by a plurality of mobile robots, transferring product containers from the decanting station, transferring product containers to the picking workstation, and transferring empty product containers away from the picking workstation.

20. The method of claim 19, further comprising, by the plurality of mobile robots, transferring order containers to the picking workstation, transferring order containers from the picking workstation, and transferring order containers to the delivery section.

\* \* \* \* \*